United States Patent [19]

Lang

[11] Patent Number: 4,736,706

[45] Date of Patent: Apr. 12, 1988

[54] ANIMAL LITTER AND PROCESS FOR THE PRODUCTION THEREOF

[75] Inventor: Ridiger Lang, Minden, Fed. Rep. of Germany

[73] Assignee: Mars, Inc., McLean, Va.

[21] Appl. No.: 871,082

[22] Filed: Jun. 5, 1986

[30] Foreign Application Priority Data

Jun. 7, 1985 [DE] Fed. Rep. of Germany ....... 3520384

[51] Int. Cl.$^4$ ............................................. A01K 1/015
[52] U.S. Cl. ....................................................... 119/1
[58] Field of Search ................................. 119/1; 424/76

[56] References Cited

U.S. PATENT DOCUMENTS

| | | | |
|---|---|---|---|
| 3,892,846 | 7/1975 | Wortham | 119/1 X |
| 3,950,546 | 4/1976 | Hill et al. | 119/1 X |
| 4,494,481 | 1/1985 | Rodriguel et al. | 119/1 |
| 4,622,920 | 11/1986 | Goss | 119/1 |

FOREIGN PATENT DOCUMENTS

| | | |
|---|---|---|
| 013935 | 8/1980 | European Pat. Off. . |
| 076447 | 4/1983 | European Pat. Off. . |
| 327907 | 10/1920 | Fed. Rep. of Germany . |
| 2640341 | 3/1978 | Fed. Rep. of Germany . |
| 2902108 | 8/1980 | Fed. Rep. of Germany . |
| 3121403 | 1/1984 | Fed. Rep. of Germany . |

*Primary Examiner*—Carl D. Friedman
*Assistant Examiner*—Richard E. Chilcot, Jr.
*Attorney, Agent, or Firm*—Curtis, Morris & Safford

[57] ABSTRACT

Animal litter made from or in conjunction with a porous, odor-preventing material with a clearly defined pH-value, characterized in that the pH-value of the porous inorganic material in aqueous suspension is betwen approximately 7 and 9, preferably 7.5 and 8.5, that the porous inorganic material has a zinc content of 0.1 to 2.0% by weight and that the water-soluble zinc proportion of the porous inorganic material is 0.01 to 100 ppm, as well as a process for the production thereof.

14 Claims, No Drawings

ANIMAL LITTER AND PROCESS FOR THE PRODUCTION THEREOF

The present invention relates to animal litter or bedding material made from or in conjunction with a porous, odour-preventing, inorganic material with a clearly defined pH-value, as well as to a process for the production thereof.

Known materials for the production of animal litter are generally natural products having a mineral or organic origin, such as pumice, clay materials, moler, sawdust, peat and kieselguhr, which as a result of their porous structure have the properties of being able to absorb liquids in the pores.

DE-AS No. 29 02 079 discloses an animal litter, in which use is made of synthetically produced calcium silicate hydrate granules (C-S-H) with a tobermorite structure. German Pat. No. 31 21 403 discloses an animal litter in which for preventing odour formation with acid materials, the pH-value is dropped to between approximately 5.8 and 6.2, in the case of an aqueous suspension.

It has been found that the aforementioned C-S-H, already known for use as animal litter, is only adequately stable in the alkaline range, so that the reduction of the pH-value of this material to below 7 leads to a risk of the granules or pores being destroyed, which would prejudice the odour-preventing action. When using acids this process takes place very rapidly, i.e. within hours, whereas when acid metal salt solutions are used the process takes place more slowly, but still impairs the odour prevention.

EP-OS No. 0 109 276 discloses the treatment of various solid absorption materials with water-soluble salts of transition metals from groups I b or II b of the periodic system, whereby said materials are supposed to provide an improved odour prevention action when they are used as animal litter. However, the evolution of ammonia cannot be effectively and permanently prevented without respecting a specific pH-value range, when used on C-S-H.

The problem of the present invention is therefore to provide an animal litter of the aforementioned type, as well as a process for the production thereof, in which the formation of ammonia is effectively prevented, particularly in the case of C-S-H and simultaneously it is possible to reliably prevent the strongly smelling sulphur-containing substances, such as occur in cat's urine.

According to the invention, this problem is solved by an animal litter of the aforementioned type, which is characterized in that the pH-value of the porous inorganic material in aqueous suspension is between approximately 7 and 9, preferably 7.5 and 8.5, that the porous inorganic material has a zinc content of 0.1 to 2.0% by weight and that the water-soluble zinc proportion of the porous inorganic material is 0.01 to 100 ppm.

The porous inorganic material can be tobermorite.

According to the invention, optionally the zinc content is 0.5 to 1.5% by weight, preferably 1 to 1.3% by weight.

According to the invention, the porous inorganic material can be treated with an aqueous solution of a water-soluble zinc salt.

In some embodiments of invention the water-soluble zinc salt is zinc chloride.

According to the invention, the water-soluble zinc salt is used together with an alkali metal and/or alkaline earth salt and/or mixtures thereof.

The inventive process of the aforementioned type is characterized in that the porous material is treated with an aqueous solution of a water-soluble zinc salt in such a way that the dried animal litter has a zinc content of 0.1 to 2% by weight, preferably 0.5 to 1.5% by weight and in particular 1 to 1.3% by weight. An inorganic material can be used as the porous material.

According to the invention, the porous inorganic material is typically, but not necessarily, chosen from the group consisting of clay, moler, pumice, etc.

In some embodiment of the invention tobermorite is used as the porous inorganic material.

Additionally, the certain embodiments of the invention during the treatment of the porous material with the aqueous solution of the water-soluble zinc salt, the pH-value of the porous material, in aqueous suspension, is set to a value between approximately 7 and 9, preferably 7.5 to 8.5, the water-soluble zinc content being 0.01 to 100 ppm.

According to an embodiment of the invention during the treatment of the porous material with the aqueous solution of the water-soluble zinc salt, to said solution is added an alkali metal and/or alkaline earth salt and/or mixtures thereof.

In some embodiments of the invention the zinc salt is absorbed on the porous material.

Another embodiment of the invention is characterized in that the aqueous solution of the water-soluble zinc salt is sprayed on to the porous material.

The invention is based on the surprising finding that a reliable solution to the problem previously discussed can only be achieved if, in the claimed manner, both the inventively provided pH-value and the inventively provided zinc content are adjusted in combination, namely using water-soluble zinc salts. Due to their amphoteric character, they do not completely react with the preferably used carrier materials C-S-H, so that there is still adequate water-soluble zinc months after the production of the animal litter. Thus, normally, after three to six months, the pH-value of the product does not exceed pH 9 and is conventionally in the range 8.0 to 8.5, even after such long periods. On the one hand, this ensures an adequate reduction of the pH-value to effectively prevent the evolution of ammonia and on the other hand the material is still in the alkaline range, so that the C-S-H is stable and the zinc is still able to form stable complex compounds with the strongly smelling sulphur-containing substances, such as occur in cat's urine. When using other, chemically neutral materials, such as clay, moler, pumice, etc., although the pH-value drop does not occur, a pH-value rise due to the evolution of ammonia is still reliably prevented by zinc.

The claimed pH-values, measured in aqueous solution, apply in a determination method as provided hereinafter. 10 g, accurate to within 0.1 g, of a homogeneous sample (500 g) of the porous inorganic material are weighed into a 250 ml beaker. Over the thus obtained sample is poured 90 ml of distilled water thermostatically controlled to 20° C., which is briefly agitated with a glass rod and left to stand for 4½ minutes. This is followed by stirring for 30 seconds with a subsequent immediate pH-measurement, the pH-value being read after 1 minute.

Further features and advantages of the invention can be gathered from the following description, in which an embodiment is explained in detail.

EMBODIMENT

According to DE-As No. 29 02 079 a calcium silicate granular material with a tobermorite structure is produced, which has a specific BET $N_2$ surface of 50 to 60 $m^2/g$ and a $CaO/SiO_2$ ratio of 0.46 to 0.51. Hardening takes place in the autoclave at 13 bar for 5 hours. At the product temperature of max 100° C., a zinc salt solution is sprayed in the airless process on to the calcium siicate granules. This leads to an at least 50% surface covering of the individual granules. The spray solution consists of 20% by weight of $Zn\ Cl_2$, 33% by weight of $Mg\ Cl_2 \times 6\ H_2O$ and 47% be weight water. The desired pH-value and zinc content are obtained with a spray percentage of 14%, based on the end product weight.

Following spraying, the product is dried at a temperature of max 140° C.

The thus prepared, treated calcium silicate granules have superior characteristics to known animal litter materials, particularly with respect to cat's urine.

Alkali metal and alkaline earth metal salts other than the diluent $Mg\ Cl_2 \times 6\ H_2O$ described in the above example can be used.

The features of the invention disclosed in the above description and claims can be essential to the realization of the different embodiments of the invention, either singly or in random combination.

What is claimed is:

1. Animal litter which comprises an odor-preventing porous inorganic material treated with a water-soluble zinc salt, said treated porous inorganic material having a pH-value of from approximately 7 to approximately 9 in aqueous suspension, said treated porous inorganic material having a zinc content of from 0.5 to 1.5 percent by weight, and the water-soluble zinc portion of said treated porous inoganic material being 1 to 100 ppm.

2. Animal litter according to claim 1, wherein the porous inorganic material is a calcium silicate hydrate granule with a tobermorite structure.

3. Animal litter according to claim 1 or 2, wherein the water-soluble zinc salt is zinc chloride.

4. Animal litter according to claim 1, wherein said porous inorganic material has been treated with a water-soluble zinc salt and an agent selected from the group consisting of alkali metal salts, alkaline earth metal salts, and mixtures thereof.

5. A process for producing animal litter, which comprises treating an odor-preventing porous inorganic material with an aqueous solution of a water-soluble zinc salt and drying said treater porous inorganic material, said treatment being carried out in such manner that the dried treated porous inorganic material has a zinc content of 0.5 to 1.5 percent by weight, a water-soluble zinc portion of 1 to 100 ppm and a pH-value, when in aqueous suspension, of from approximately 7 to approximately 9.

6. A process according to claim 5, wherein the zinc content is from 1 to 1.3 percent by weight.

7. A process according to claim 5, wherein the porous inorganic material is treated with an aqueous solution of said water-soluble zinc salt and with an agent selected from the group consisting of alkali metal salts, alkaline earth metal salts, and mixtures thereof.

8. A process according to claim 5, wherein the porous inorganic material is tobermorite.

9. A process according to claim 5, wherein the porous inorganic material is clay, moler or pumice.

10. A process according to claim 5, wherein the pH-value is from 7.5 to 8.5.

11. A process according to claim 5, wherein the porous inorganic material is treated with the zinc salts in such manner that said salt is absorbed on the porous inorganic material.

12. A process according to claim 5, wherein the aqueous solution of the water-soluble zinc salt is sprayed on the porous inorganic material.

13. Animal litter according to claim 1, wherein said pH-value is from 7.5 to 8.5.

14. Animal litter according to claim 1, wherein said zinc content is from 1 to 1.3 percent by weight.

* * * * *